(12) United States Patent
Park

(10) Patent No.: US 8,706,344 B2
(45) Date of Patent: *Apr. 22, 2014

(54) IMPACT SENSING AND IDENTIFICATION SYSTEM FOR PEDESTRIAN PROTECTION DEVICE

(71) Applicant: Robert Bosch GmbH, Stuttgart (DE)

(72) Inventor: Seo-Wook Park, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,812

(22) Filed: May 21, 2013

(65) Prior Publication Data

US 2013/0253778 A1    Sep. 26, 2013

Related U.S. Application Data

(63) Continuation of application No. 12/891,373, filed on Sep. 27, 2010, now Pat. No. 8,463,486.

(51) Int. Cl.
*G01M 17/00* (2006.01)
*B60K 28/10* (2006.01)
*B60D 1/28* (2006.01)

(52) U.S. Cl.
USPC .......... 701/29.1; 701/30.8; 180/274; 180/271

(58) Field of Classification Search
USPC ............. 701/29, 301; 296/197.04; 280/754; 340/436
See application file for complete search history.

(56) References Cited

U.S. PATENT DOCUMENTS

| | | | |
|---|---|---|---|
| 6,561,301 B1 | 5/2003 | Hayashi et al. | |
| 6,600,412 B2 | 7/2003 | Ishizaki et al. | |
| 7,353,087 B2 | 4/2008 | Takafuji et al. | |
| 7,488,015 B2 | 2/2009 | Lu et al. | |
| 7,541,917 B2 | 6/2009 | Hosokawa | |
| 7,543,474 B2 | 6/2009 | Bieck et al. | |
| 7,737,833 B2 | 6/2010 | Takafuji | |

(Continued)

FOREIGN PATENT DOCUMENTS

| | | |
|---|---|---|
| DE | 102007002274 | 7/2008 |
| WO | 03082639 | 10/2003 |

OTHER PUBLICATIONS

PCT/US2011/053362 International Search Report and Written Opinion dated Jan. 9, 2012 (13 pages).

(Continued)

*Primary Examiner* — Thomas Black
*Assistant Examiner* — Tyler Paige
(74) *Attorney, Agent, or Firm* — Michael Best & Freidrich LLP

(57) ABSTRACT

A system for identifying an object impacting a vehicle bumper during a collision. The system receives acceleration values from each of a plurality of sensors and calculates a center strength value based on the acceleration values. The center strength value is indicative of the amount of force that is applied to the center of the vehicle bumper. The system then determines a preliminary impact location on the vehicle bumper based at least in part on the acceleration values. A normalized intrusion value is calculated based on the center strength value, the impact location, and a bumper stiffness factor. The bumper stiffness factor is indicative of the stiffness of the bumper at the impact location. The system then identifies the object impacting the vehicle bumper based at least in part on the normalized intrusion value.

8 Claims, 6 Drawing Sheets

(56) References Cited

U.S. PATENT DOCUMENTS

| | | |
|---|---|---|
| 8,374,751 B2 * | 2/2013 | Katz et al. ............ 701/45 |
| 8,463,486 B2 * | 6/2013 | Park ............ 701/30.8 |
| 2004/0186643 A1 | 9/2004 | Tanaka et al. |
| 2007/0100526 A1 | 5/2007 | Heimerl et al. |
| 2007/0125589 A1 | 6/2007 | Murphy |
| 2007/0164574 A1 | 7/2007 | Tanabe |
| 2007/0198155 A1 | 8/2007 | Danisch |
| 2009/0204294 A1 * | 8/2009 | Mack et al. ............ 701/45 |
| 2010/0030433 A1 * | 2/2010 | Suzuki ............ 701/45 |
| 2010/0191401 A1 * | 7/2010 | Mack et al. ............ 701/29 |

OTHER PUBLICATIONS

United States Patent Office Action for U.S. Appl. No. 12/891,373 dated Sep. 24, 2012 (11 pages).

* cited by examiner

IMPACT SENSING AND IDENTIFICATION SYSTEM FOR PEDESTRIAN PROTECTION DEVICE

RELATED APPLICATIONS

This application is a continuation of U.S. patent application Ser. No. 12/891,373, filed on Sep. 27, 2010 and entitled "IMPACT SENSING AND IDENTIFICATION SYSTEM FOR PEDESTRIAN PROTECTION DEVICE," the entire contents of which are incorporated by reference.

BACKGROUND

The present invention relates to systems for identifying an object contacting the front bumper of a vehicle during a collision. In many vehicle accidents involving a pedestrian, the pedestrian is struck by the front bumper of the vehicle. Serious injuries can occur if the pedestrian's head strikes the hood of the vehicle. Therefore, some vehicles are equipped with passive pedestrian protection systems such as pedestrian-friendly bumpers. Active pedestrian protection systems are also used. Some active pedestrian protection systems raise the hood of the vehicle to better absorb the force of the impact with a pedestrian when a pedestrian impact is detected.

SUMMARY

In order to appropriately activate an active pedestrian protection system, the vehicle system must be able to accurately differentiate between a pedestrian and other objects that may impact the vehicle bumper during a collision. However, the stiffness of the bumper is not homogenous and the sensing area of a bumper is relatively wide. When an object strikes the vehicle bumper, the bumper deforms differently depending on the object's mass, the impact speed, and the bumper stiffness at the location of the impact. Assuming the same conditions of an object impact, i.e., same mass and speed, the bumper intrusion is different depending on impact location because the bumper stiffness is not homogeneous. As a consequence, it is possible to classify the object type by means of bumper intrusion, if bumper stiffness characteristics are known.

Some embodiments of the invention provide methods to determine the bumper stiffness at different locations on the bumper surface. These variations in stiffness are represented as a bumper stiffness curve. Using test data at different impact locations with the same object mass and speed, the intrusion at each impact location can be calculated by a double integral of the acceleration signal. Based on a simple spring-mass system model of the bumper, the bumper stiffness curve can be obtained by taking a reciprocal of the intrusion curve. The bumper stiffness curve is used for object classification.

In some embodiments, data from three accelerometers mounted in the bumper fascia is used. An object impact location is identified using two-dimensional data analysis based on a calculated offset and center strength. The offset distance from the bumper center can be calculated by comparing the difference of intrusions detected at left and right sensors. However, due to differences in stiffness across the surface of the bumper, it is hard to achieve a precise identification of impact location with only the offset value.

In one embodiment, the invention provides a system for identifying an object impacting a vehicle bumper during a collision. The system includes a plurality of sensors positioned to detect acceleration of the vehicle bumper relative to the vehicle. Changes in acceleration as detected by the sensors represent an intrusion into the bumper surface caused by an object colliding with the vehicle bumper. The plurality of sensors includes a left-side sensor, a right-side sensor, and a middle sensor. The system also includes a processor and a memory storing instructions. When the instructions are executed by the processor, the system receives acceleration values from each of the plurality of sensors and calculates a center strength value based on the absolute sum of the acceleration values. The center strength value is indicative of the amount of force that is detected at the middle location of the vehicle bumper. The system then determines a preliminary impact location on the vehicle bumper based at least in part on the acceleration values. A normalized intrusion value is calculated based on the center strength value, the impact location, and a bumper stiffness factor. The bumper stiffness factor is indicative of the stiffness of the bumper at the impact location. The system then identifies the object impacting the vehicle bumper based at least in part on the normalized intrusion value. In some embodiments of the invention, the system identifies the object as a pedestrian based at least in part on the normalized intrusion value and then activates the pedestrian protection system.

In some embodiments of the invention, the bumper stiffness factor is determined by collecting calibration data including a plurality of acceleration values obtained by measuring the acceleration of the bumper caused by an impact at each of a plurality of locations on the surface of the vehicle bumper. The impact at each of the plurality of locations is caused by an object of a defined mass traveling at a defined velocity. An intrusion curve is then defined for the surface of the bumper by calculating the double integral of the plurality of acceleration values. The bumper stiffness factor for each location of the bumper surface is then determined by taking the reciprocal of the intrusion curve.

In some embodiments of the invention, the system determines an impact location on the vehicle bumper by identifying a sensor of the plurality of sensors that detects the largest intrusion value. A freeze time is then determined as the time instant when a velocity of the intrusion detected by the sensor is equal or less than zero after being greater than zero for a period of time. The time instant is indicative of the moment when the vehicle bumper begins to rebound towards its original shape after being compressed by the impact. A normalized offset value is calculated by dividing the absolute value of the difference between an intrusion detected by the left-side sensor at the freeze time and an intrusion detected by the right-side sensor at the freeze time by the sum of the intrusions detected by the right-side sensor, the left-side sensor, and the middle sensor at the freeze time.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
FIG. 1 is a perspective view of an activated pedestrian protection system after the vehicle bumper has detected an impact.
Figures 2A, 2B:
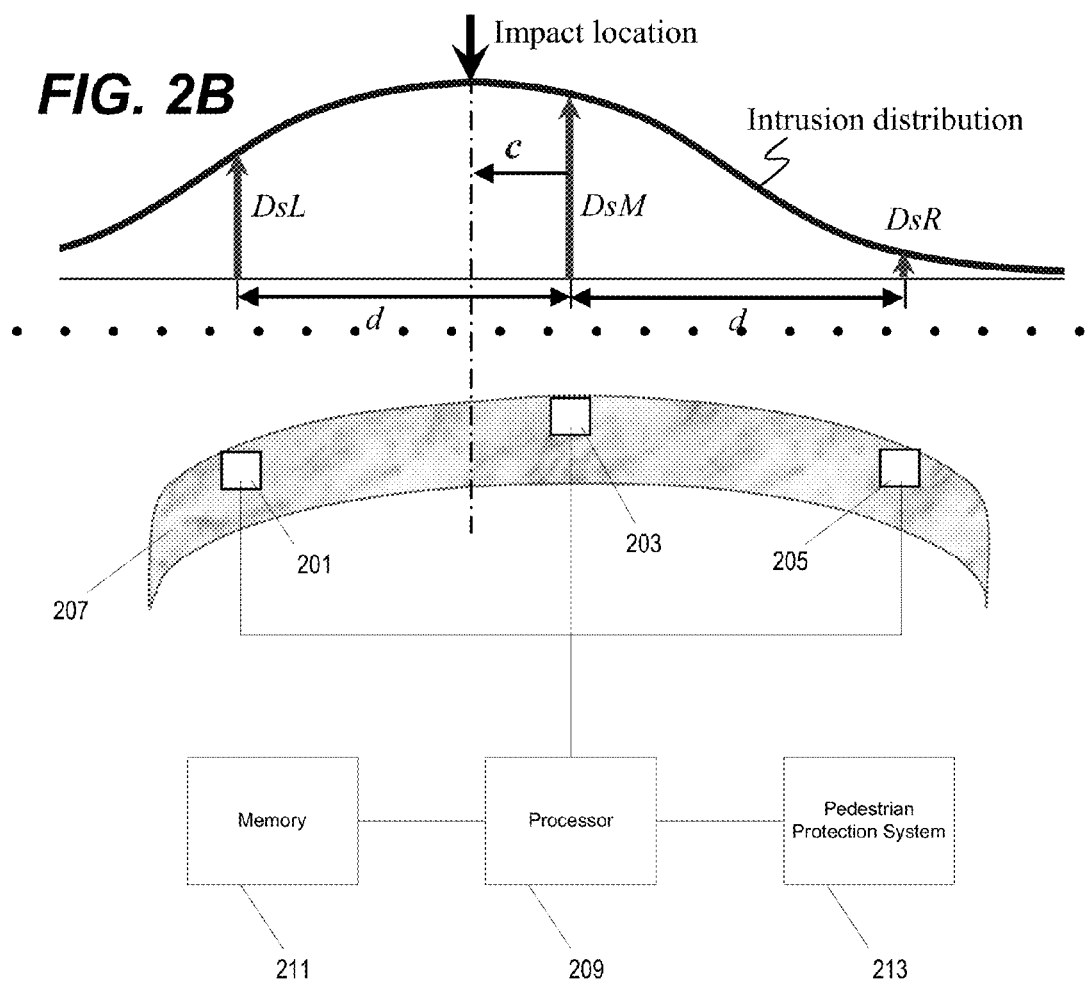
FIG. 2A is a schematic diagram of the components of the pedestrian protection system.
FIG. 2B is a graph showing the distribution of force across the surface of the bumper during a collision.

FIG. 1 illustrates a deployed pedestrian protection system. The vehicle 101 has struck a pedestrian 103. After determining that the vehicle bumper 105 has struck a pedestrian 103, the vehicle hood 107 is raised slightly to better absorb the force of the impact between the pedestrian 103 and the vehicle hood 107. FIG. 2A illustrates a system for evaluating a force exerted on the vehicle bumper 105 and for determining whether the object impacting the bumper 105 is a pedestrian 103 or another object such as a small animal, a traffic cone, or a trash bin (not pictured). The pedestrian protection system raises the vehicle hood 107 to absorb the impact only if it is determined that the object impacting the bumper is a pedestrian. The vehicle hood 107 is not raised if the pedestrian protection system determines that the object is not a pedestrian 103.

As illustrated in FIG. 2A, the system includes three accelerometers 201, 203, and 205 mounted in the bumper fascia 207. The three sensors are positioned at the left of the bumper (sensor 201), the center of the bumper (sensor 203), and the right of the bumper (sensor 205). Each sensor measures an acceleration of the bumper fascia 207 relative to the rest of the vehicle 101. These acceleration values are indicative of an object impacting and deforming the shape of the bumper fascia 207 causing an intrusion. The acceleration values sensed by each of the sensors 201, 203, and 205 are transmitted to a processor 209. The processor 209 executes computer-readable instructions that are stored to a memory 211 to evaluate the acceleration signals and to determine whether the object impacting the bumper fascia 207 is a pedestrian. If the processor determines that the object is a pedestrian, the processor activates the pedestrian protection system 213 and the vehicle hood 107 is raised to better absorb the impact.

Figure 3:
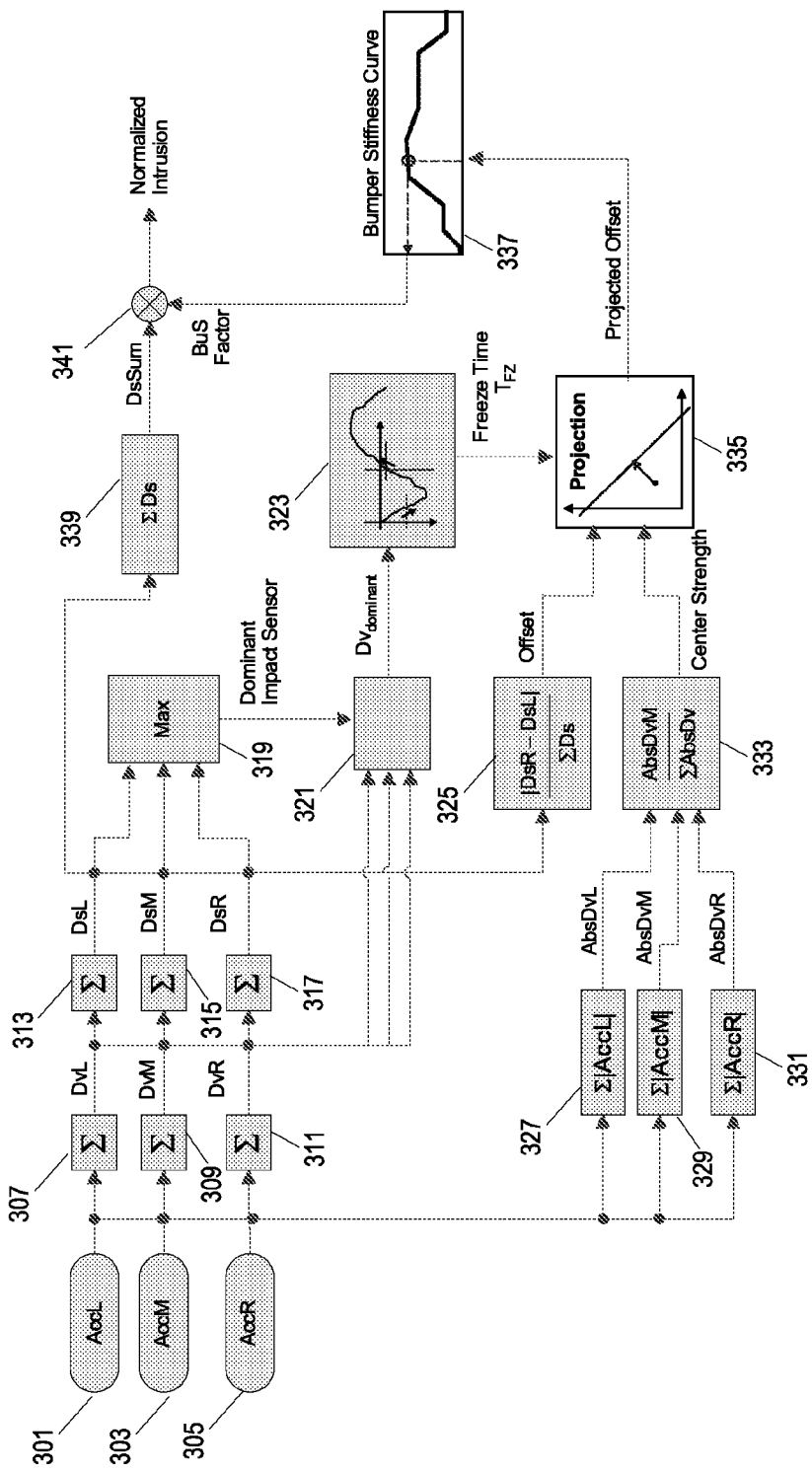
FIG. 3 is a flowchart of the system calculating a normalized intrusion value.

FIG. 3 illustrates a method of evaluating the acceleration signals received from each of the three sensors 201, 203, and 205 to determine a normalized intrusion value that can be used to determine whether the vehicle bumper has impacted a pedestrian regardless of the location of the impact on the bumper. The acceleration signals 301, 303, and 305 from each of the three sensors is integrated once (step 307, 309, and 311) to determine the change in velocity of the intrusion at the location of each sensor and integrated a second time (steps 313, 315, and 317) to determine the change in intrusion depth. A dominant impact sensor is identified by comparing the intrusion depth for each sensor (step 319). The change in the velocity of the intrusion for the dominant impact sensor is selected (step 321) and used to determine a freeze time for the impact (step 323).

Figures 4, 5:
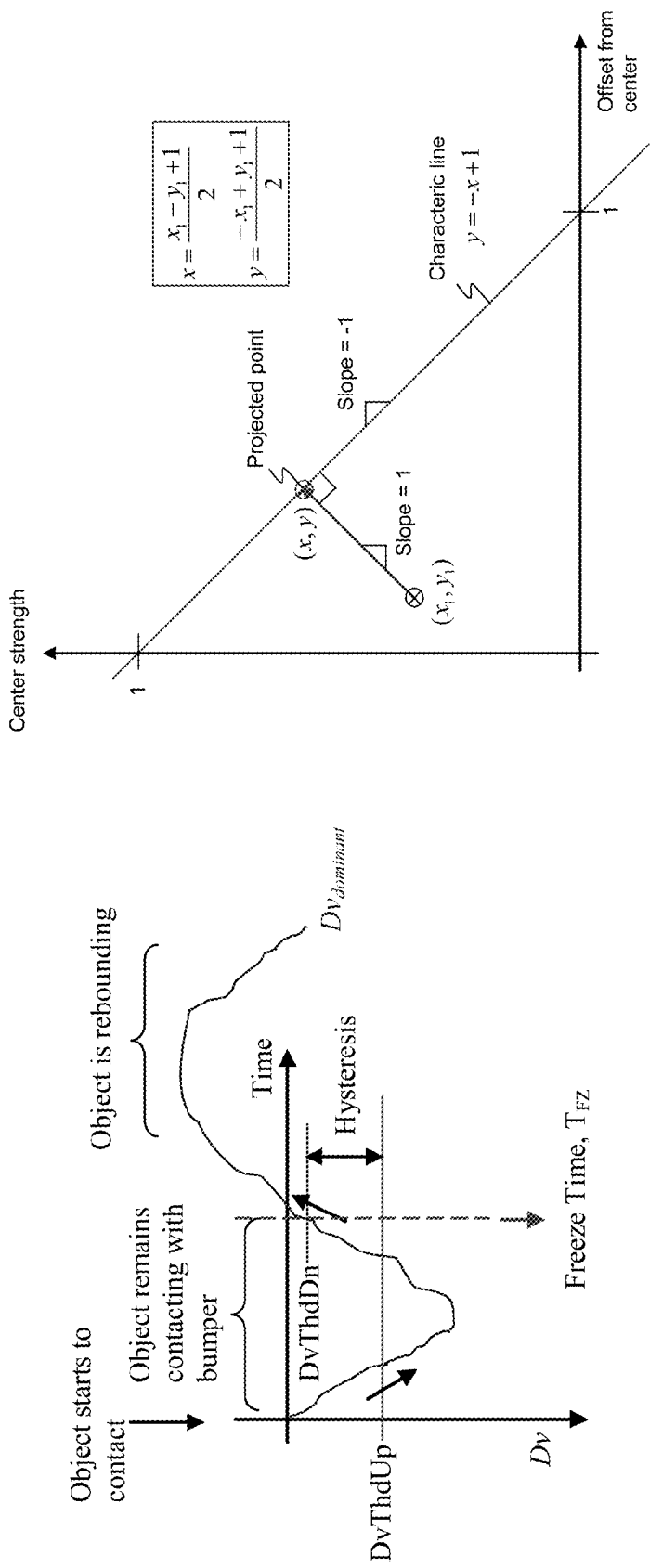
FIG. 4 is a graph illustrating the freeze-time used to determine the normalized intrusion value in the method of FIG. 3.
FIG. 5 is a graph illustrating data points projected onto a −45° characteristics line in order to determine a correlation between the calculated center strength of the impact and the offset from the center of the bumper.

Because the bumper fascia will vibrate after impacting an object, the freeze time is defined as the time instant at which the data received from the acceleration sensors is evaluated to determine whether the vehicle has struck a pedestrian. FIG. 4 illustrates how the freeze time is defined based on the change in velocity of the dominant impact sensor. When the delta velocity of dominant impact sensor, $Dv_{dominant}$, exceeds a predefined threshold (DvThdUp), the location of dominant impact sensor is locked. During the period of time from when the absolute value of the velocity begins increasing until the time when the velocity returns to zero, the object remains in contact with the bumper fascia 207 and the intrusion of the object into the bumper fascia continues to increase. When $Dv_{dominant}$ drops below DvThdDn, the intrusion into the bumper fascia 207 is no longer increasing and the shape of the bumper fascia will begin to rebound towards its original shape. Because the data received from the sensors 201, 203, and 205 while the bumper fascia 207 is rebounding is not indicative of the intrusion caused by the object, any data received after the freeze time will not be used to determine the impact location (or offset from bumper center). In some embodiments, the threshold values include a hysteresis to avoid unwanted result due to noise.

After the dominant sensor is identified and the freeze time has been determined, the system proceeds to determine the impact location or the distance of the impact from the center of the bumper. The offset calculation (step 325) is based on an intrusion value from each sensor at the freeze time. As described above, the intrusion value is obtained by determining the double integral of the acceleration signal from each of the three sensors 201, 203, and 205. FIG. 2B illustrates an example of how the force from an impact on the bumper fascia is detected by the three sensors 201, 203, and 205. The impact occurs at a distance c from the center of the bumper. Because the impact force is roughly proportional to an intrusion for a given stiffness value, the force detected by the middle sensor can be expressed by the following equation.

$$\text{Force} = (\text{stiffness}) \times (\text{intrusion}) \times (\text{offset distance from center}) \qquad (1)$$

The initial calculation of bumper offset assumes that the stiffness of the bumper is uniform at each location across the bumper fascia. Therefore, the rotational equilibrium of the impact as detected by each of the three sensors 201, 203, and 205 can be expressed by the following equation.

$$DsL \times (d-c) = DsM \times c + DsR \times (d+c) \qquad (2)$$

Therefore, the normalized offset value of the impact from the center of the bumper can be obtained by the following equation.

$$\frac{c}{d} = \frac{DsL - DsR}{DsL + DsM + DsR} = \frac{DsL - DsR}{\Sigma D_s} \qquad (3)$$

However, the assumption that the stiffness of the bumper is uniform is not accurate. As such, the method illustrated in FIG. 3 evaluates other aspects to determine a more accurate projected offset value. One other aspect that is evaluated by the system is the proportion of the total impact that is exerted on the center of the bumper fascia (hereinafter, the "center strength"). An absolute sum of acceleration is calculated for each sensors (steps 327, 329, and 331). The absolute sum of acceleration represents impact strength. The center strength is calculated according to the following equation (step 333).

$$S_{CTR} = \frac{AbsDvM}{AbsDvL + AbsDvM + AbsDvR} \quad (4)$$

Figure 6A:
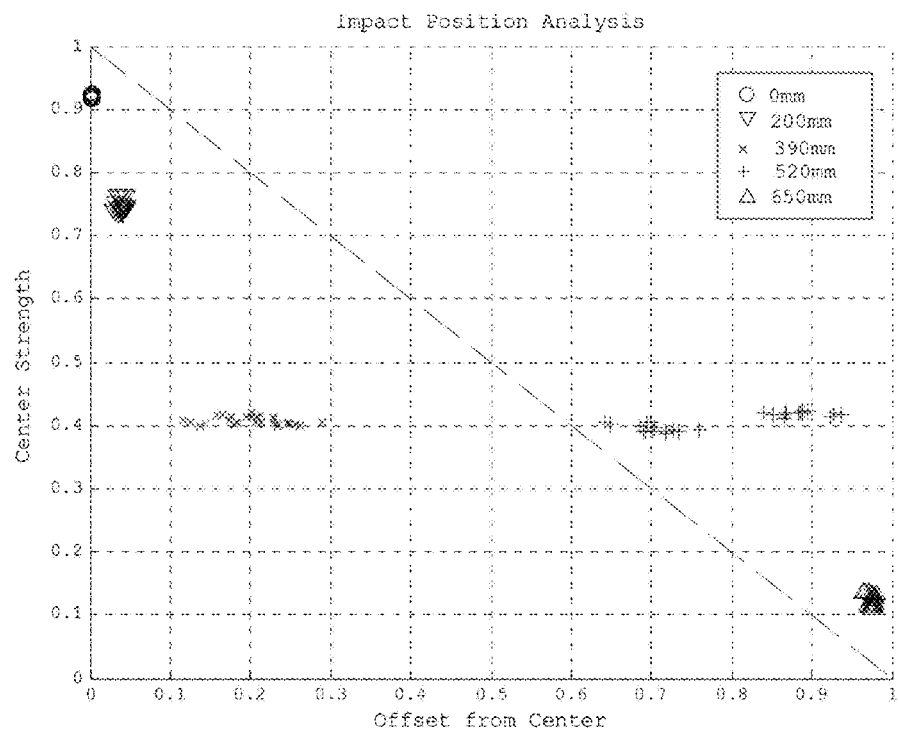
FIG. 6A is a graph of raw test data illustrating the relationship between center strength of an impact and the offset from center.
Figure 6B:
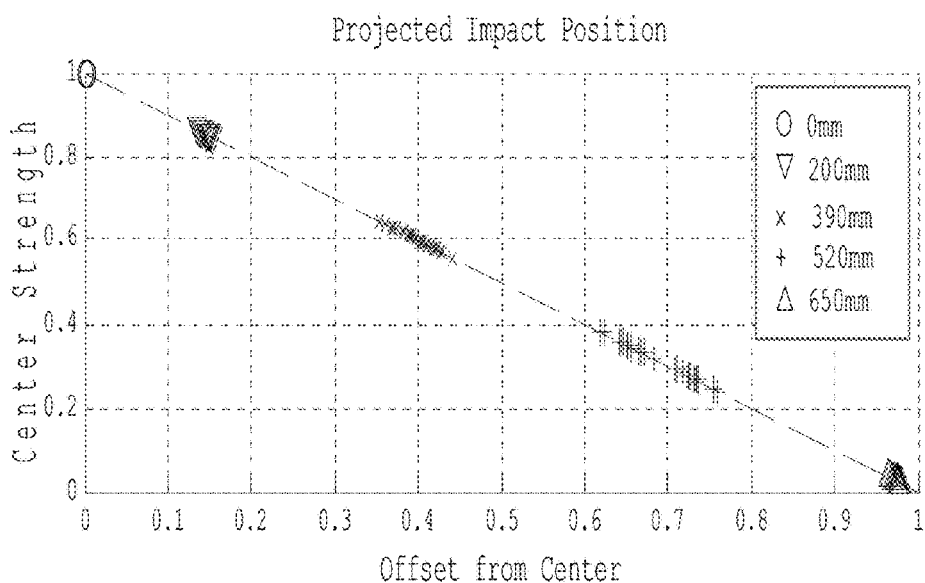
FIG. 6B is a graph of the rate test data of FIG. 6A projected onto the −45° center line as illustrated in FIG. 5.

The initial offset value and the center strength value are then subjected to a two-dimensional domain analysis in which each combination of center strength and initial offset value are projected onto a characteristics line having a $-45°$ slope (step 335). Projecting the values onto such a characteristics line is appropriate because an impact with a small offset from center will have a high center strength value and an impact with a large offset from center will have a low center strength value. FIG. 5 illustrates how the data points are projected onto the characteristics line. The projected point on the characteristics line is defined as the point at which a line extending from the actual data point (center strength, offset) intersects perpendicularly with the characteristics line, which can be calculated using the equations illustrated in FIG. 5. FIGS. 6A and 6B further illustrate how several raw data points are projected onto the characteristics line. The raw data points are shown in FIG. 6A relative to the characteristics line. In FIG. 6B, the data points have been projected onto the characteristics line.

As described above, the initial offset value calculated by step 325 is not accurate because it assumes that the stiffness of the bumper is uniform across the surface of the bumper. However, by projecting the data point onto characteristics line, the system calculates a new, more accurate projected offset based on the center strength of the impact. The projected offset value is the x variable of the projected point as illustrated in FIG. 5.

A vehicle bumper structure consists of bumper beam, energy absorbing (EA) foam or plastic, and bumper fascia. When an object strikes the vehicle bumper, the bumper deforms depending on an object mass, an impact speed, and bumper stiffness at the location of the impact. Even though the object mass and impact speed remain the same regardless of the location of the impact, variations in bumper stiffness across the surface of the bumper affect the intrusion caused at the location of impact. In fact, the bumper stiffness is inversely proportional to the intrusion caused by an object. When the same impact forces are applied at different impact locations with the same object mass and velocity, each impact location will exhibit a different amount of intrusion depending on the bumper stiffness at the location of impact.

Therefore, to more accurately identify the object impacting the vehicle bumper, the system calculates a normalized intrusion value based on the calculated projected offset and a predetermined set of bumper stiffness values. A look-up table is used to identify a bumper stiffness factor (BuS factor) at the projected offset location (step 337). The normalized intrusion value is calculated by taking the sum of the intrusion values (DsSum) at the freeze time (step 339) and multiplying the sum (DsSum) by the bumper stiffness factor (BuS Factor) at the projected offset location (step 341).

Figure 7:
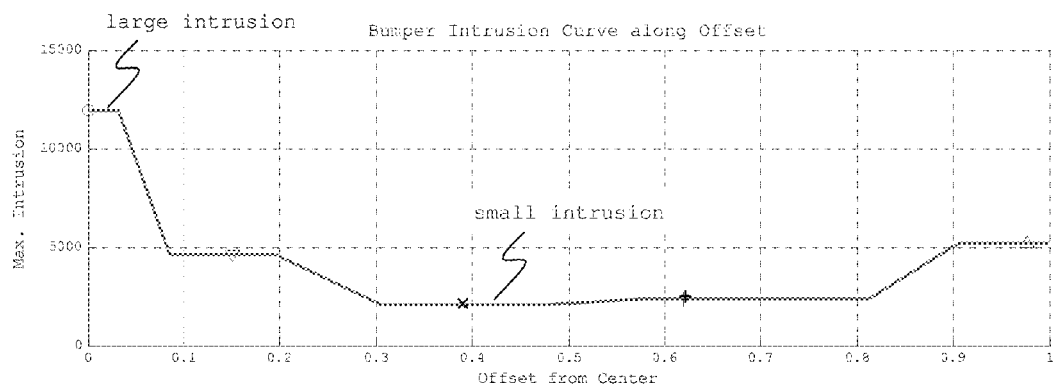
FIG. 7 is a graph illustrating a bumper intrusion curve as determined by calibration data.
Figure 8:
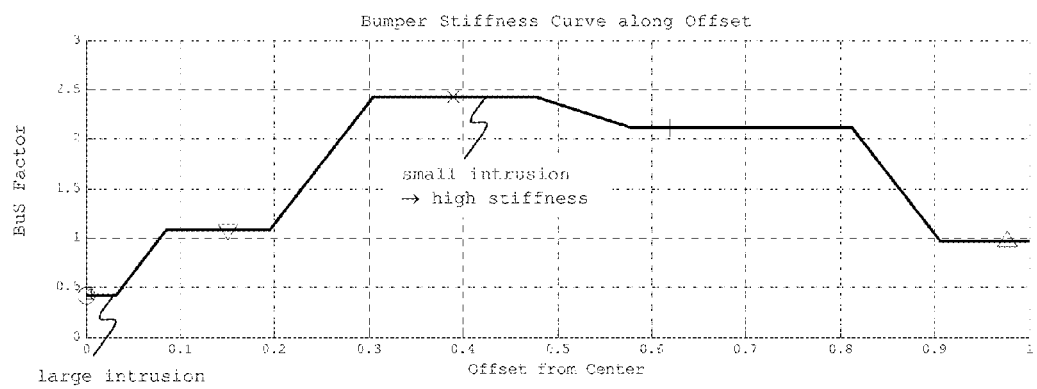
FIG. 8 is a graph illustrating a bumper stiffness curve as determined by the bumper intrusion curve of FIG. 7.

In some systems, the look-up table used to identify the applicable bumper stiffness factor at each location of the bumper is generated based on calibration data. Under test conditions, a uniform force is exerted at a number of locations across the surface of the bumper. The force is exerted by an object of a defined mass at a defined velocity. The intrusions caused by the impact at each location are used to define an intrusion curve as illustrated in FIG. 7. Because the mass and the velocity of the object remain the same, the intrusion value at each location is indicative of the bumper stiffness at that location. Therefore, a bumper stiffness curve (as illustrated in FIG. 8) is generated by taking the inverse of the intrusion curve. The bumper stiffness curve of FIG. 8 is used to generate a look-up table that defines the applicable bumper stiffness factor at each location across the surface of the bumper.

Figure 9:
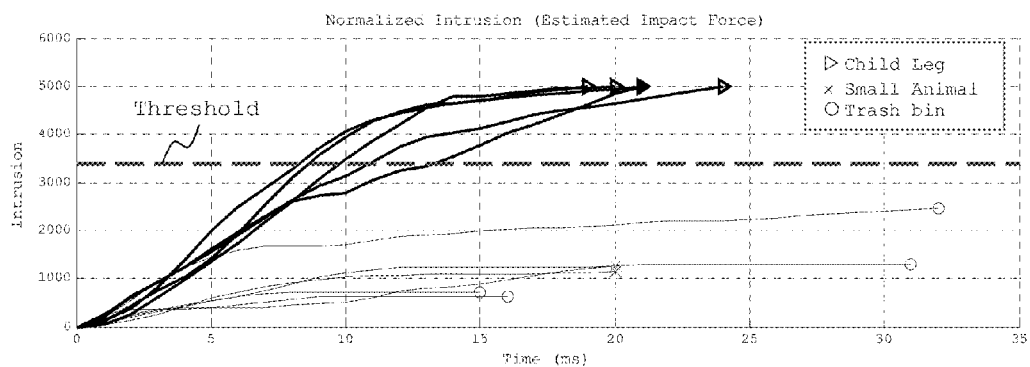
FIG. 9 is a graph illustrating how the normalized intrusion value calculated according to the method of FIG. 3 is used to identify when the object impacting the bumper is a pedestrian.

The normalized intrusion value calculated according to FIG. 3 is indicative of the type of object that is impacting the vehicle bumper regardless of the location of the impact on the bumper surface. As such, the normalized intrusion value can be compared to a threshold to determine whether the object is a pedestrian or a different object. As illustrated in FIG. 9, a small animal or trash bin will cause a smaller normalized intrusion than the leg of a child or a pedestrian. As such, if the normalized intrusion value is greater than a threshold, the system determines that the bumper has struck a pedestrian and the pedestrian protection system is activated causing the vehicle hood to be raised as illustrated in FIG. 1.

In other embodiments, the normalized intrusion value calculated according to FIG. 3 is used for more advanced data processing. For example, a stationary object such as a tree or a utility pole will cause a greater intrusion than a pedestrian. As such, in some embodiments, if the normalized intrusion value is greater than a second threshold, the system determines that the object is not a pedestrian and does not activate the pedestrian protection system. Similarly, the stationary object will cause the intrusion to occur faster than a moveable object such as a pedestrian. As such, in some embodiments, the system will identify the impacting object as a pedestrian only if the normalized intrusion is greater than a first threshold and the freeze time (indicating the velocity of the intrusion) is greater than a second threshold.

Thus, the invention provides, among other things, a system and method for determining a normalized intrusion value that is used to identify the type of object impacting a vehicle bumper regardless of the location of the impact. Various features and advantages of the invention are set forth in the following claims.

What is claimed is:

1. A system for identifying an object impacting a vehicle bumper during a collision, the system comprising:
   a plurality of sensors including a left-side sensor positioned near a left side of the vehicle bumper, a right-side sensor positioned near a right side of the vehicle bumper, and a middle sensor positioned near the middle of the vehicle bumper;
   a processor; and
   a memory storing instructions that, when executed by the processor, cause the system to
      receive acceleration values from each of the plurality of sensors,
      calculate a center strength value of an impact based on the acceleration values, the center strength value being indicative of an amount of force that is applied to a middle location of the vehicle bumper,
      determine an impact location on the vehicle bumper based at least in part on the acceleration values,
      calculate a normalized intrusion value based on the center strength value, the impact location, and a bumper stiffness factor, the bumper stiffness factor being indicative of the stiffness of the bumper at the impact location, and identify the object impacting the vehicle bumper based on the normalized intrusion value.

2. The system of claim 1, wherein the bumper stiffness factor is determined by
- collecting calibration data including a plurality of acceleration values obtained by measuring the acceleration of the bumper caused by an impact at each of a plurality of locations on a surface of the vehicle bumper, wherein the impact at each of the plurality of locations is caused by an object of a defined mass traveling at a defined velocity,
- defining an intrusion curve for the surface of the vehicle bumper by calculating the double integral of the plurality of acceleration values, and
- determining a reciprocal of the intrusion curve.

3. The system of claim 1, wherein the memory includes instructions that, when executed by the processor, cause the system to calculate a center strength value by
- calculating a first absolute sum of acceleration values received from the middle sensor during a period of time,
- calculating a second absolute sum of acceleration values received from each of the left-side sensor, the middle sensor, and the right-side sensor during the period of time, and
- calculating the center strength value by dividing the first absolute sum by the second absolute sum.

4. The system of claim 1, wherein the memory includes instructions that, when executed by the processor, further cause the system to activate a pedestrian protection system when the system identifies the object impacting the vehicle bumper as a pedestrian.

5. A method of identifying an object impacting a vehicle bumper during a collision, the method comprising:
- receiving acceleration values from each of a plurality of sensors, the plurality of sensors including a left-side sensor positioned near a left side of the vehicle bumper, a right-side sensor positioned near a right side of the vehicle bumper, and a middle sensor positioned near a middle of a vehicle bumper;
- calculating a center strength value of an impact based on the acceleration values, the center strength value being indicative of an amount of force that is applied to the middle location of the vehicle bumper,
- determining an impact location on the vehicle bumper based at least in part on the acceleration values;
- determining a bumper stiffness factor;
- calculating a normalized intrusion value based on the center strength value, the impact location, and the bumper stiffness factor, and
- identifying the object impacting the vehicle bumper based on the normalized intrusion value.

6. The method of claim 5, wherein the bumper stiffness factor is determined by
- collecting calibration data including a plurality of acceleration values obtained by measuring the acceleration of the bumper caused by an impact at each of a plurality of locations on a surface of the vehicle bumper, wherein the impact at each of the plurality of locations is caused by an object of a defined mass traveling at a defined velocity,
- defining an intrusion curve for the surface of the vehicle bumper by calculating the double integral of the plurality of acceleration values, and
- determining a reciprocal of the intrusion curve.

7. The method of claim 5, wherein the act of calculating a center strength value includes
- calculating a first absolute sum of acceleration values received from the middle sensor during a period of time,
- calculating a second absolute sum of acceleration values received from each of the left-side sensor, the middle sensor, and the right-side sensor during the period of time, and
- calculating the center strength value by dividing the first absolute sum by the second absolute sum.

8. The method of claim 5, further comprising activating a pedestrian protection system when the system identifies the object impacting the vehicle bumper as a pedestrian.

* * * * *